United States Patent [19]

Windross

[11] Patent Number: 5,222,794
[45] Date of Patent: Jun. 29, 1993

[54] FIBEROPTIC LINE-OF-LIGHT ILLUMINATING DEVICE

[75] Inventor: Gene R. Windross, Westland, Mich.

[73] Assignee: Ford Motor Company, Dearborn, Mich.

[21] Appl. No.: 810,840

[22] Filed: Dec. 20, 1991

[51] Int. Cl.⁵ ............................................. F21V 7/04
[52] U.S. Cl. ................................................... 362/32
[58] Field of Search ......................................... 362/32

[56] References Cited

U.S. PATENT DOCUMENTS

| 4,677,531 | 6/1987 | Szeles | 362/32 |
| 4,811,172 | 3/1989 | Davenport et al. | 362/61 |
| 4,868,718 | 9/1989 | Davenport et al. | 362/32 |
| 4,949,227 | 8/1990 | Finch et al. | 362/61 |
| 4,958,263 | 9/1990 | Davenport et al. | 362/32 |
| 5,136,480 | 8/1992 | Pristash et al. | 362/32 |

Primary Examiner—Carroll B. Dority
Attorney, Agent, or Firm—Damian Porcari; Roger L. May

[57] ABSTRACT

A fiberoptic line-of-light illuminating device includes a fiberoptic cable providing a plurality of optical fiber bundles, a housing including a block which encapsulates output ends of the optical fibers in splayed-out fashion to form a thin elongated line. The device also includes a single optical lens, which may be a cylindrical lens or a modified cylindrical lens having different lens shapes formed into the surface thereof, mounted in a transverse cylindrical cavity in the housing in parallel relation to the output ends of the optical fibers and transverse relation to the output ends of the optical fibers for receiving light emitted from the optical fibers. The lens focuses the light in a desired pattern and may be rotated to clean the lens and/or adjust the beam pattern. The housing also has an elongated slot located between the output ends and a rear side of the transverse cavity. The slot which communicates the output ends with the rear side of the transverse cavity provides a passage from the output ends to the lens to pass light emitted from the optical fibers in the pattern of the thin line through the slot to the lens.

16 Claims, 2 Drawing Sheets

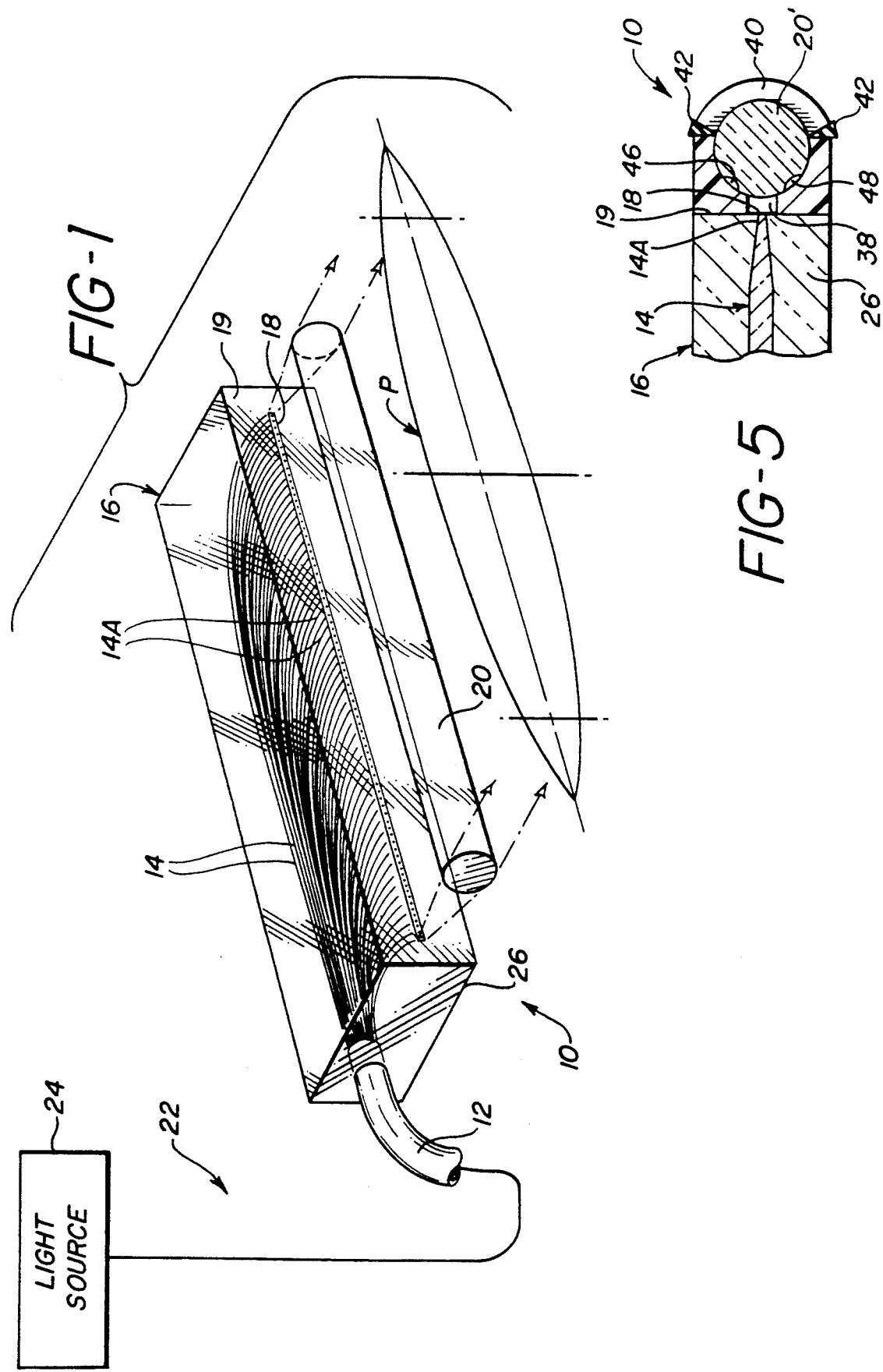

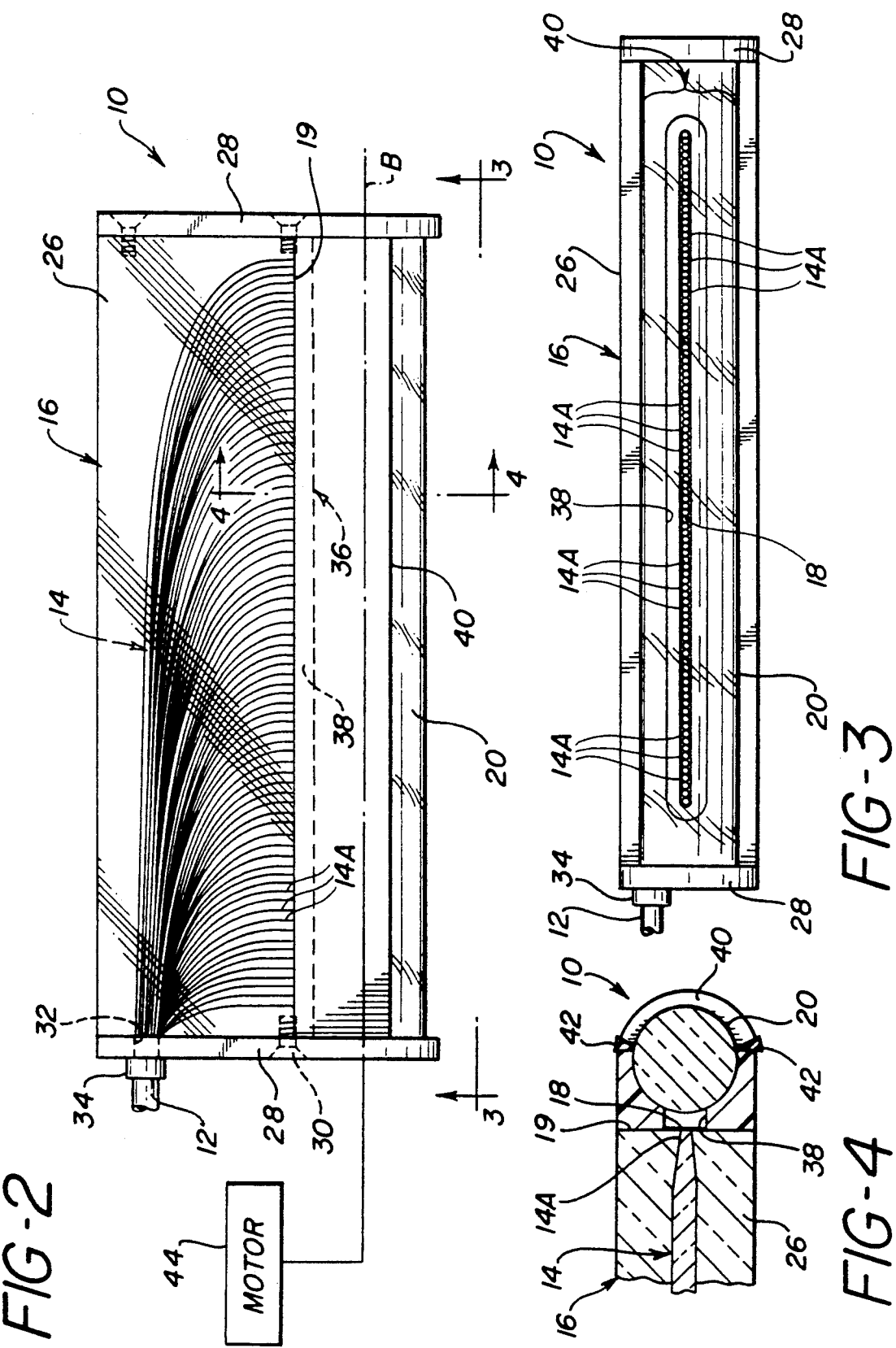

FIBEROPTIC LINE-OF-LIGHT ILLUMINATING DEVICE

CROSS-REFERENCE TO RELATED APPLICATION

Reference is hereby made to a copending patent application, by the same applicant and assigned to the same assignee, disclosing related subject matter entitled "Miniaturized Fiberoptic Illuminating Device", U.S. patent application Ser. No. 811,791, filed Dec. 20, 1991.

BACKGROUND OF THE INVENTION

The present invention relates generally to fiberoptic lighting systems and, more particularly, to a fiberoptic line-of-light illuminating device, such as a headlamp, employing a plurality of optical fibers for emitting output light, a single elongated aperture for passing a thin line of output light, and a single lens for receiving and focusing the output light.

It is well known in the field of fiberoptics that optical fibers are capable of effectively and efficiently conducting light from a common source along nonlinear paths to various locations remote from the light source without encountering substantial transmission losses. Because of this capability, there is increasing interest in the application of optical fibers to uses where space is restricted. One such use is the overall illumination needs of vehicles where space is scarce due to aerodynamic and styling considerations.

One general approach to the application of optical fibers to vehicular illumination needs is proposed in U.S. Pat. No. 4,811,172 to Davenport et al., U.S. Pat. No. 4,868,718 to Davenport et al., U.S. Pat. No. 4,949,227 to Finch et al., and U.S. Pat. No. 4,958,263 to Davenport et al., all assigned to General Electric Company. These patents disclose various lighting systems that basically employ a plurality of optical fibers having their respective input ends coupled to a high intensity common light source and their respective output ends individually coupled to respective ones of a plurality of paired apertures and optical lenses. Thus, the operative principle underlying this approach is to use one lens and one aperture per optical fiber.

While this general approach may fulfill overall illumination requirements, a major shortcoming is that it fails to accommodate space limitations dictated by vehicular aerodynamic and styling requirements. The provision of one lens and one aperture per optical fiber results in devices much too large to find general application to all locations where illumination is required in vehicles. Thus, there is a need for a fiberoptic illuminating device that will satisfy the overall illumination requirements of vehicles while avoiding the aforementioned major shortcoming.

SUMMARY OF THE INVENTION

This need is met by the fiberoptic line-of-light illuminating device of the present invention. The operative principle underlying the present invention is to use a single optical lens which is preferably a cylindrical or a modified cylindrical one and a thin line of splayed output ends of all optical fibers of the illuminating device.

An illuminating device constructed in accordance with the operative principle of the cited prior art patents will have a total length which is at least equal to the combined lengths of the individual lenses used in the device. For instance, where each lens is a spherical Fresnel lens one inch square, an illuminating device having nine optical fibers under the prior art approach is at least nine inches in length. The lenses taken together add excessive length to the device.

In contrast thereto, the length of an illuminating device constructed in accordance with the operative principle of the present invention is dependent upon the length of the single lens and the splay that is required to accommodate the desired number of optical fibers. For example, for the same number of optical fibers a single optical lens and single a splay having a length of three and one-half inches is required. Therefore, it can be readily seen that a fiberoptic illuminating device constructed in accordance with the operative principle of the present invention is substantially miniaturized compared to one constructed in accordance with the operative principle of the cited prior art patents.

In the preferred embodiment, the output ends of a plurality of optical fibers are splayed out in a row in a block within a housing so as to form a thin line of splayed output ends. The housing may provide for an elongated slot between the output ends and the single lens.

Preferably the single optical lens is a cylindrical one which is retained within a cavity in a housing body and which may be rotatable within that cavity. Rotatability permits cleaning of all surfaces of the lens. In the most preferred embodiment, the housing body may have a blade, gasket, or grommet of an elastomeric (rubber, polymer, foam rubber, polymeric foam, etc.) or other material interfitted therein so that it contacts the lens and wipes it clean during rotation of the lens.

Alternatively, the single optical lens may be non-cylindrical or a modified cylindrical shape. For example, different lens shapes may be formed into the rear surface of an otherwise cylindrical lens to provide different beam patterns such as high beam, low beam, etc. With such a modified cylindrical shape, the different beam pattern may be selected by indexing the lens to different portions of rotation about its axis.

It is thus a feature of the present invention to provide a fiberoptic illuminating device using a single optical lens and a thin line of splayed output ends of optical fibers; to provide the illuminating device where the splayed output ends of all optical fibers pass a correspondingly thin line of light to the lens; to provide the illuminating device having a housing to support the output ends of the optical fibers and the lens in the desired spaced relationship; and to provide the illuminating device where the housing defines an elongated slot between the splayed output ends and the lens to pass light emitted from the fiberoptic cables to the single lens.

An advantage of the present miniaturized fiberoptic illuminating device in addition to its space saving features, is its ease of assembly and alignment. A single lens is easier to assemble, easier to align, and less likely to become unaligned than the one-lens-per optic fiber systems.

Other features and advantages of the invention will become apparent from the following description, the accompanying drawings and the appended claims.

BRIEF DESCRIPTION OF THE DRAWINGS

FIG. 1 is a schematic representation of a fiberoptic line-of-light illuminating device constructed in accordance with the operative principle of the present invention;

FIG. 2 is a top plan view of a preferred embodiment of the fiberoptic illuminating device;

FIG. 3 is a front elevational view of the fiberoptic illuminating device as seen along line 3—3 of FIG. 2;

FIG. 4 is a sectional view of the fiberoptic illuminating device taken along line 4—4 of FIG. 2; and FIG. 5 is a sectional view of the miniaturized fiberoptic illuminating device showing an alternative modified cylindrical lens.

DETAILED DESCRIPTION OF THE PREFERRED EMBODIMENT

Referring to FIG. 1 of the drawings, there is illustrated a schematic representation of a fiberoptic line-of-light illuminating device, generally designated 10, having a construction in accordance with the operative principle of the present invention. While the device 10 of the present invention is generally applicable to a variety of lighting applications, it is particularly suited for use in vehicle forward lighting applications such as high beam and low beam headlamps, driving lights, corner lights and turn signals. A preferred embodiment of the illuminating device 10 in the form of a headlamp is illustrated in FIGS. 2-4.

Referring now to FIGS. 1-4, the fiberoptic line-of-light illuminating device 10 basically includes a large fiberoptic cable 12 providing a plurality of bundles of optical fibers, each containing a large number of individual filaments, hereinafter referred to as optical fibers 14, for conducting and emitting output light, a housing body 16 defining a thin elongated line 18 of splayed output ends of optical fibers 14 for passing a thin line of output light, and a single lens 20 for receiving and focusing the output light in a desired pattern P. The illuminating device 10 is part of a lighting system, indicated by the numeral 22, which has a light source 24 coupled in a well-known conventional way to input ends of the optical fibers 14 of the large fiberoptic cable 12. Any suitable light source 24 can be utilized, such as the one described in my copending U.S. patent application Ser. No. 656,919, filed Feb. 19, 1991 and now abandoned, which discloses an illuminator, comprising a single ellipsoidal reflector which receives a light source at a first focal point of the reflector and light receiver means positioned at a second focal point for collecting light from the light source and reflector which can then be routed to an area to be illuminated, such as the headlight area in a motor vehicle.

The ellipsoidal reflector is proportioned such that the distance between its first and second focal points is equal to the distance between its first focal point and a first apex adjacent to its first focal point which is also equal to the distance between its second focal point and a second apex adjacent its second focal point. This proportioning also permits two or more ellipsoidal reflector segments to be formed into a housing with the reflective portions of the segments positioned to face one another. The resulting housing is adapted to receive a single light source at the substantially aligned first focal points of all the reflector segments and define light collection points at the second focal points of the reflector segments. Light receiver means, such as fiber optics, parabolic segment reflectors, lenses or the like are positioned at the light collection points.

The housing body 16 has a thin elongated line 18 of splayed output ends on a face of a block 26 and has a pair of opposite side strips 28 being secured to opposite sides of the block 26 by suitable means, such as pairs of threaded fasteners 30. One of the side strips 28 has an opening 32 surrounded by a connector 34 which couples with the large fiberoptic cable 12. Leading portions of the optical fibers 14 emerge from the large fiberoptic cable 12 through the side strip 28 and into the housing body 16 where they may be encapsulated in block 26. The encapsulated optical fibers 14 at their output ends 14A are arranged in splayed out fashion in a row as shown by thin elongated line 18.

Thus, as shown in FIG. 2 there are hundreds of optical fibers 14, on the order of 0.002 inches in diameter. Optical fibers 14 are splayed within block 26 and at the output ends 14A are further spread and formed into a stack of 5-10 layers of filaments 0.02 to 0.04 inches thick. Such a splay will result in a fiberoptic ribbon or thin elongated line 18. Block 26 may be an acrylic or epoxy material which will encapsulate optical fibers 14. The thin elongated line 18 of exposed output ends 14A results from cutting and polishing face 19 of block 26, exposing the output ends 14A of optical fibers 14.

Light emitted from the optical fibers 14 passes from the thin elongated line 18 toward the single cylindrical lens 20. Preferably, the thin elongated line 18 has a configuration of a rectangular ribbon for passing an elongated thin-line pattern of light. However thin elongated line 18 can have other configurations for providing other light pattern shapes.

The housing body 16 also has a single cylindrical cavity 36 spaced forwardly of the thin elongated line 18. The cylindrical cavity 36 contains the single cylindrical lens 20 and extends in transverse relation to the output ends 14A of the optical fibers 14 and parallel relation to the thin elongated line 18. The construction of the housing body 16 thus ensures alignment of central axes "A" of the end portions 14A of the optical fibers 14 in generally parallel relation with each other and generally perpendicular intersecting relation with a central axis "B" of the cylindrical lens 20.

The housing body 16 further has an elongated slot 38 located between the thin elongated line 18 and the rear side of the transverse cavity 36. The slot 38 which communicates the thin elongated line 18 with the rear side of the transverse cavity 36 provides a passage from the thin elongated line 18 to the cylindrical lens 20 to pass light emitted from the optical fibers 14 in the pattern of the thin line through the slot 38 to the lens 20. Slot 38 spaces the output ends 14A of optical fibers 14 from the lens 20 at a distance which is approximately the focal length of lens 20. The housing body 16 also defines a substantially semi-cylindrical opening 40 along a front end intersecting with a front side of the transverse cavity 36 for permitting light focussed by the lens 20 in the desired pattern P to pass from the housing body 16. As shown in FIG. 4, there is fitted in housing body 16 a blade, gasket or grommet 42 which may be an elastomeric material such as rubber, polymer, foam rubber, polymeric foam, etc. which will wipe clean cylindrical optical lens 20 when lens 20 is rotated within cavity 36. Thus, as shown in FIG. 2, a motor 44, such as a stepper motor, may be attached to lens 20 for rotation of lens 20 around central axis B. By periodically rotating lens 20 around central axis B, the exterior, light receiving/transmitting surfaces of cylindrical optical lens 20 may be cleaned. Blade, gasket or grommet 42 may be made replaceable so that a fresh one can be inserted when the old one becomes soiled. The forward end portions of the side strips 28 of the housing 16 close the opposite ends of the transverse cavity 36. Either one of the side strips 28 can be detached from the housing body 26 in order to remove the cylindrical lens 20 from the housing 16.

Thus, the thin elongated line 18 of splayed output ends 14A of the optical fibers 14 passes a thin line of light through the elongated slot 38 to the single cylindrical lens 20. The cylindrical lens 20 then collimates the emergent light in the vertical direction and focuses the light in the desired pattern P. A practical example of some of the dimensions of the illuminating device 10 are as follows. In a rectangular configuration, the thin elongated line 18 has a height in the range of from 0.020 to 0.040 inch and a width of 3½ inches. The cylindrical lens 16 is ½ inch in height and 3½ inches in length with a 0.4 inch focal length.

Referring to FIG. 5, where like reference numerals have been used to the extent possible, there is shown a modified cylindrical lens 20' which is formed from a cylindrical one, but has lens shapes 46, 48 formed therein. The beam pattern, such as high beam, low beam, fog light, etc., can be selected by rotating the lens so that lens shape 46, lens shape 48, or an unshaped area of lens 20' is aligned with the thin elongated line 18 in order to focus light from opening 40 in the desired pattern.

Having thus described the fiberoptic line-of-light illuminating device of the present invention in detail and by reference to a preferred embodiment thereof, it will be apparent that modifications and variations are possible without departing from the scope of the invention defined in the appended claims.

What is claimed is:

1. A fiberoptic line-of-light illuminating device, comprising:
    means providing a plurality of optical fibers for conducting light, said optical fibers having output ends for emitting light;
    means defining a thin elongated line of said output ends of all of said optical fibers; and
    a single cylindrical optical lens aligned with said thin elongated line for receiving light emitted from said optical fibers and passed through said output ends and focusing the light in a desired pattern.

2. The device of claim 1 further comprising a housing having therein a block encapsulating said output ends of said optical fibers arranged in a splayed-out fashion to form said thin elongated line.

3. The device of claim 2 wherein said thin elongated line has a configuration of a rectangular ribbon.

4. The device of claim 3 wherein said housing also defines an elongated cavity containing said cylindrical lens and spaced forwardly from and extending in transverse relation to said output ends of said optical fibers.

5. The device of claim 4 wherein said housing further defines an elongated slot disposed between said output ends and a rear side of said elongated cavity for providing a passage between said output ends and said single cylindrical lens to pass light emitted from said optical fibers to said cylindrical lens.

6. The device of claim 5 further including a means to rotate said cylindrical lens about its axis within said elongated cavity.

7. The device of claim 6 wherein said housing includes a blade, gasket or grommet therein which is in contact with said cylindrical lens.

8. The device of claim 1 wherein said cylindrical lens has different lens shapes formed into the surface thereof.

9. A lighting system, comprising:
    a source of light;
    means providing a plurality of optical fibers for conducting light, said optical fibers coupled to said light source for receiving light and having output ends for emitting light;
    means defining a thin elongated line of said output ends of all of said optical fibers; and
    a single cylindrical optical lens aligned with said thin elongated line for receiving light emitted from said optical fibers and passed through said output ends and focusing the light in a desired pattern.

10. The system of claim 9 further comprising a housing having therein a block encapsulating said output ends of said optical fibers arranged in a splayed-out fashion to form said thin elongated line.

11. The system of claim 10 wherein said thin elongated line has a configuration of a rectangular ribbon.

12. The system of claim 11 wherein said housing also defines an elongated cavity containing said cylindrical lens and spaced forwardly from and extending in transverse relation to said output ends of said optical fibers.

13. The system of claim 12 wherein said housing further defines an elongated slot disposed between said output ends and a rear side of said elongated cavity for providing a passage between said output ends and said single cylindrical lens to pass light emitted from said optical fibers to said cylindrical lens.

14. The system of claim 13 further including a means to rotate said cylindrical lens about its axis within said elongated cavity.

15. The system of claim 14 wherein said housing includes a blade, gasket or grommet therein which is in contact with said cylindrical lens.

16. The system of claim 9 wherein said cylindrical lens has different shapes formed into the surface thereof.

* * * * *